May 8, 1962  R. ADELL  3,033,403
DEVICE FOR HOLDING ADDITIVE FOR AUTOMOBILE
WINDSHIELD WASHING LIQUID
Filed July 20, 1959  2 Sheets-Sheet 1
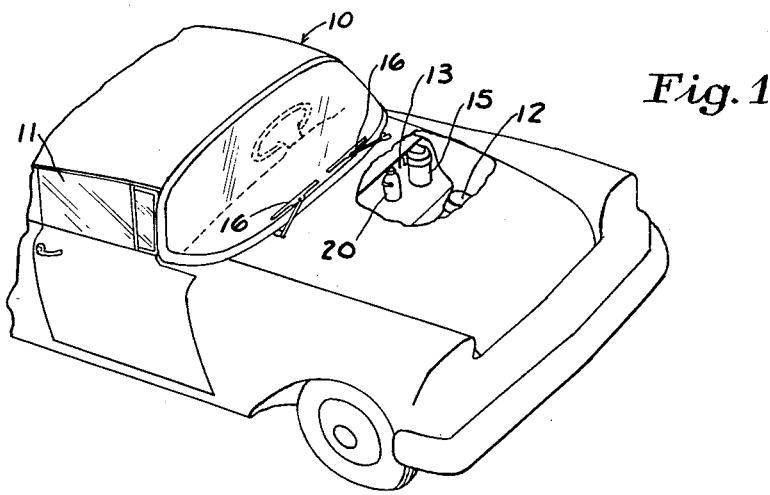
Fig. 1
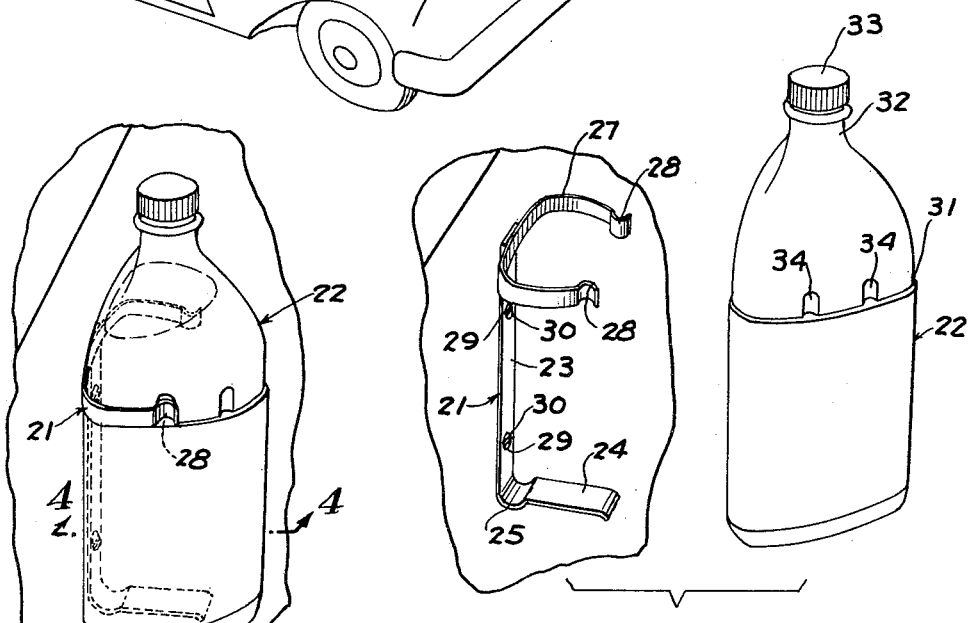
Fig. 2
Fig. 3
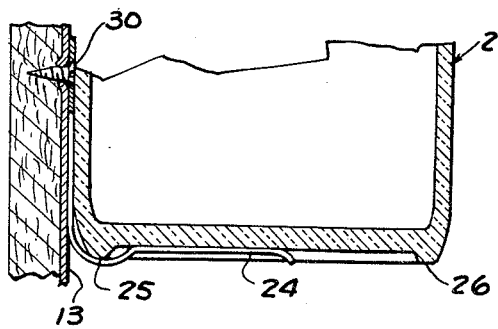
Fig. 4
INVENTOR.
ROBERT ADELL
BY Gregory S. Dolgurukov
ATTORNEY May 8, 1962 R. ADELL 3,033,403
DEVICE FOR HOLDING ADDITIVE FOR AUTOMOBILE
WINDSHIELD WASHING LIQUID
Filed July 20, 1959 2 Sheets-Sheet 2

INVENTOR.
ROBERT ADELL
BY
ATTORNEY

United States Patent Office 3,033,403
Patented May 8, 1962

3,033,403
DEVICE FOR HOLDING ADDITIVE FOR AUTOMOBILE WINDSHIELD WASHING LIQUID
Robert Adell, Detroit, Mich., assignor to Adell Chemical Corporation, Detroit, Mich., a corporation of Michigan
Filed July 20, 1959, Ser. No. 828,289
6 Claims. (Cl. 215—1)

This invention relates to automobiles and more particularly to an improved device for storing therein additive for the liquid used in windshield washing mechanisms of such automobiles.

Windshield washing devices or, more accurately, devices for sprinkling water on the windshield to enable the windshield wipers to clean the windshield from dust and dirt without excessive friction and in a quick and thorough manner, have now become universally accepted devices not only as a convenience for the driver, but also as devices necessary for safe operation of a motor vehicle.

It has been found that water alone is not fully effective for such purpose since it is not capable of washing away dust having admixture of oil and similar substances, usually finding their way to windshields. In addition, it is desired that washing liquids do not freeze at temperatures prevailing during the winter, at least in portions of the country with moderate climate, and their freezing point be at least a few degrees below that of water. Therefore, in order to satisfy this requirement, such liquids must have admixture of alcohol. Use of glycerin, although very effective to lower the freezing temperature of the liquid, is objectionable as leaving a deposit on the windshield. Therefore, such additives usually have industrial alcohol as their base. Approximately two liquid ounces of such liquid additive is required for a glass jar of water, forming the liquid supply for such windshield washing device. Such glass jar is usually installed under the engine hood and is connected to the sprinkling jets with the aid of rubber or plastic tubes.

It has been found, however, that it is not practical to seal such additive materials in two ounce bottles, since, as a result thereof, the user is usually out of a supply when the jar has to be refilled. Accordingly, a six ounce bottle has now become virtually standard for such materials and constitutes a staple item in the automotive trade.

However, great disadvantages have been encountered in packaging, distribution, and use of the liquid material of this nature, causing serious inconvenience to many millions of people. It has been found, for instance, that when the new bottle is purchased and approximately one-third of its contents is poured into the jar for use, preserving the once opened bottle with the remainder of its contents for use within the next few months presents difficulties and inconvenience. In the first place, the only convenient place for storing such a bottle is the glove compartment of the automobile, where, because of the insufficient height of the compartment, the bottle has to be stored in a horizontal position. It was found, however, that unless the cap of such a bottle is replaced very tightly, the contents of the bottle leak out, often spoiling articles in the glove compartment.

In addition, since such a bottle cannot be stored in the glove compartment in a vertical position, i.e. standing but must be placed on its side, it usually rolls in the glove compartment causing annoying noise which often is difficult to diagnose and, therefore, is often attributed to engine difficulty, sometimes even causing unnecessary worry.

But even apart from the above difficulties, the necessity for filling station attendants to ask the vehicle operator to check the glove compartment for the remainder of the additive and to return it to the operator after handling it, usually with oily hands, is undesirable. Handling round glass bottles which are slippery when wet or oily is also undesirable.

In spite of the realization of these difficulties and the great annoyance resulting therefrom, no solution for the above problem that would be practical and would not introduce other problems of still greater proportions has been found.

One of the objects of the present invention is to provide an improved device for holding a windshield washing additive or solvent whereby the above difficulties and disadvantages are overcome and largely eliminated without introducing other problems or increasing appreciably the costs involved.

Another object of the present invention is to provide an improved device for holding windshield washer solvent enabling filling station attendants to service the windshield washer mechanism and particularly to replenish the container holding the washing liquid therefor without applying to the vehicle operator for checking whether or not he has bottles in the glove compartment and if so, for handling such bottle to pour out some of its contents and then wiping it off and handing it over to the operator for returning such bottle to the groove compartment.

A further object of the present invention is to provide a device for holding additive for windshield washer mechanisms whereby such additive is made available at the same locality where the container for such liquid is installed, thus enabling a service man to reach such additive conveniently and to return its remainder in place without bothering the vehicle operator, or service the washer in the absence of the driver, such as when an automobile is left at the station for service.

A still further object of the present invention is to provide a device of the foregoing nature, thus enabling a service man to see at a glance whether the customer still has a sufficient supply of such additive or whether his supply is about to be exhausted, and a new bottle is needed.

A further object of the present invention is to provide an improved device of the foregoing nature in which the bottle or container holding the additive is held adjacent the liquid container in a secure and resiliently tight manner preventing occurrence of any rattles.

A still further object of the present invention is to provide a device of the foregoing nature, including a glass bottle which affords an exceptionally convenient and secure hand hold preventing slippage of the bottle out of wet or oily hands.

A still further object of the present invention is to provide an improved device of the foregoing character in which the bottle holding the additive is held in a resiliently tight and secure manner and yet can be easily taken out and returned in place.

A still further object of the present invention is to provide a glass bottle for holding liquids which bottle constitutes an important improvement over bottles having circular, rectangular or flash type cross section.

Further objects and advantages of this invention will be apparent from the following description and appended claims, reference being had to the accompanying drawings forming a part of this specification, wherein like reference characters designate corresponding parts in the several views.

FIG. 1 is a fragmentary perspective view illustrating the front portion of an automobile including a device embodying the present invention.

FIG. 2 is a perspective view of the device for holding additive, said device being shown separately.

FIG. 3 is an exploded perspective view showing the glass bottle or container and its supporting bracket separated from each other.

FIG. 4 is a fragmentary sectional view taken in the direction of the arrows on the vertical section plane passing through the section line 4—4 of FIG. 2, i.e. on the vertical section plane passed through the axis of the bottle.

Figure 5:
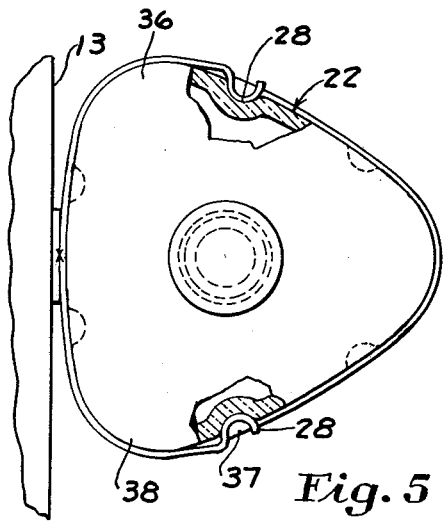
FIG. 5 is a top view of the device shown in FIG. 2.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention I eliminate packaging and distribution of the additive for automobile windshield washers in round bottles intended to be stored in glove compartments of automobiles. I provide a container made preferably, but not necessarily, of glass and adapted to be installed adjacent the water jar or container holding washing liquid for windshield washer mechanisms. Irrespective of the location of the engine, be it in front or at the rear of the vehicle, I install my improved device holding the additive for the washing liquid adjacent the container holding such liquid and in such position and proximity thereto that a filling station attendant can easily reach the additive container and return it in place without bothering the occupants of the vehicle, or waiting for his return if the automobile is left for service but the glove compartment is locked.

In accordance with the invention I install a supporting bracket adjacent the liquid container, which bracket is adapted to receive and to hold a second container, preferably a glass bottle adapted to hold a desired quantity of additive. I prefer to provide a bottle having a triangular cross section enabling the user to get an easy and secure hold on the bottle, both for removing it from the supporting bracket by twisting and for securely holding the bottle in the hand. Means are provided to produce engagement between the supporting bracket and the bottle to prevent upward movements of the bottle and to eliminate any possibility of rattling of the bottle when in place.

In the drawings there is shown, by way of example, a device embodying the present invention. Referring specifically to FIG. 1, there is shown therein a portion of an automobile generally designated by the numeral 10 and including a passenger compartment 11 and an engine compartment 12. A partition or fire wall designated by the numeral 13 is provided between said compartments 11 and 12 for separating the same. A washing liquid jar or container 15 is permanently mounted in a manner well known in the art on said partition 13 and is adapted to hold a quantity of washing liquid delivered by a pump (not shown) to the nozzles, when the pump is manually actuated, to squirt such liquid on the outside surface of the windshield, thus enabling the windshield wipers 16 to rub off any dirt that may accumulate on the surface of the windshield.

In accordance with the invention the device 20 holding the additive is mounted adjacent the container or jar 15 and, therefore, can be easily reached and used in connection with the jar 15 without the necessity of the filling station attendant walking around the vehicle and reaching into the glove compartment of the vehicle, for which operation opening the right hand door or lowering the window is necessary, or, asking the vehicle operator to get such bottle and hand it over, for which operation the vehicle operator must either move to the right in the front seat or reach far to the right to open such compartment and locate the bottle.

Referring to FIGS. 2–6, the device for holding the additive comprises a holding bracket 21, made of spring material such as spring steel, and a container or bottle 22 made preferably, but not necessarily, of glass. The holding bracket 21 comprises a vertical strip 23 having its lower end 24 bent at a right angle to extend horizontally and support the bottle 22 at its bottom as is best shown in FIG. 4. A bend 25 of a substantial radius is provided between the portions 23 and 24 of the strip in order to clear the bead 26 provided around the bottom of the bottle and thus prevent the bottom of the bottle 22 from slipping off the supporting portion 24 of the bracket. Provision of the bend 25 also prevents breakage of the portion 24 because of the fatigue of the material, which would occur if the portions 23 and 24 were bent at a sharp angle. It can be easily appreciated that providing a sufficient fillet between the portions 23 and 24 would not solve the above problem since it could interfere with the bottom edge of the bottle.

The upper end of the vertically extending strip 23 has secured thereto by spot welding or in any other suitable manner a C-shaped clip 27. The free ends of the C are provided with inwardly extending rounded bends 28 for the purposes explained in detail below. Holes 29 are provided in the strip 23 for securing the bracket 21 to the partition 13 with the aid of suitable connectors, such as self-tapping screws 30 engaging the partition 13 at prepunched serated holes.

Figure 6:
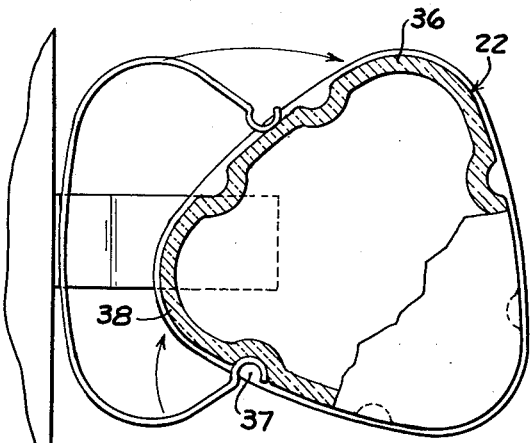
FIG. 6 is a sectional view illustrating the method of removal of the glass bottle or container from its supporting bracket.

In accordance with the invention I discard the use of round or square bottles since such bottles do not afford a convenient and secure grip, particularly for wet and greasy hands and require exertion of strong finger pressure to prevent their slipping out of one's hands. In accordance with the invention my improved container or bottle 22 has a triangular cross section as is best shown in FIG. 6, with the corners rounded on approximately a 1″ radius. By virtue of such a construction my container provides an exceedingly convenient and strong hold for the hand without the necessity of exerting strong finger pressure. The bottom of the container is recessed, thus forming the bead 26, as mentioned. A shoulder 31 is provided around the upper portion of the bottle and at such location that the lower edges of the clip 27 bear thereon and prevent the bottle from moving upward as it would have a tendency to do unless so restrained, when the vehicle wheels hit an uneven spot on the road. At its top the bottle is reduced to provide a round throat 32, the top of which is adapted to receive a screw-on cap 33.

On each of the three sides of the bottle and immediately adjacent the shoulder 31 there are provided at equal distances from the corners of the bottle two depressions 34 adapted to receive the rounded ends 28 of the C-shaped clip 27. From examination of FIGS. 2 and 5 it will be understood that when the bottle is in place, only one of the depressions 34 on each of the two sides of the bottle is engaged by said rounded portions 28 with the other depression remaining inactive. However, by the provision of two depressions, the bottle may be inserted in place with any one of its three sides bearing against the strip 23 of the supporting bracket.

From actual experience it has been found that a supporting bracket, such as disclosed herein made of spring steel with the C-shaped clip made of stock approximately 1/32″ thick, has exceedingly strong hold on the bottle. Such bottle will not come out of its bracket even if a rather strong jolt is exerted on it. To remove the bottle 22 from its supporting bracket 21, the bottle has to be taken out with a twisting movement, such as illustrated in FIG. 6, with the corner 36 of the bottle being pivoted around the point 37 provided by the bent portion 28 of the clip, and with the corner 38 moving as indicated in FIG. 6. Such removal is very easy, and instructions to that effect may be provided on the label of the bottle. To insert the bottle in place, the movements are reversed.

Figure 7:
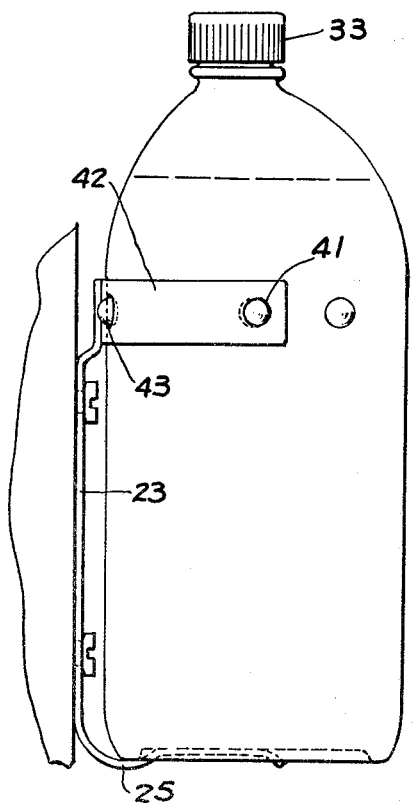
FIG. 7 is an elevational view of an improved device such as illustrated in FIG. 2 but having modified means for engagement between the bracket and the bottle.
Figure 8:
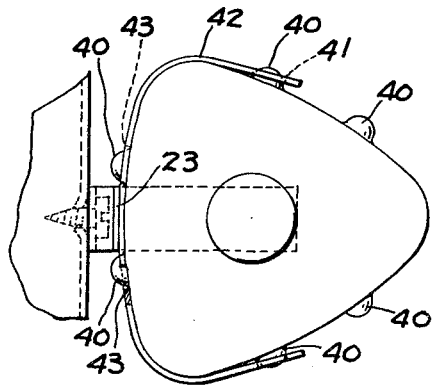
FIG. 8 is a top view of the device of FIG. 7.

FIGS. 7 and 8 illustrate an improved device of the foregoing nature, the difference being in the provision on the bottle of the raised nipples 40 instead of depressions 34 as in the construction of FIGS. 2–6. The nipples 40 cooperate with holes 41 provided in the ends of the C-shaped clip 42 secured to the strip 23. The nipples 40 of the side of the bottle toward the wall pass through the holes 43 provided in the clip 42 on both sides of the strip 23 of the bracket. The shoulder, such as 31, is eliminated in the construction of FIGS. 7 and 8. In other respects the construction and operation of the device of FIGS. 7 and 8 are substantially identical to those of the device of FIGS. 2–6, and no further description thereof is deemed to be necessary herein.

It will be understood that while the supporting bracket such as 21, and the bottle, such as 22, have been referred to above as forming my improved device for holding additive for windshield washing liquid, such device is divisible in the sense that an automobile may be equipped with the supporting bracket, such as 21, and thus be adapted to receive a bottle, such as 22, of additive which can be purchased at any time later at a filling station. Thus, an automobile equipped with such supporting bracket is an improvement over conventional automobiles for the reasons explained above.

I claim:

1. A motor vehicle having a windshield, an engine compartment, a windshield washer mechanism, a jar mounted within said engine compartment and holding a supply of washing liquid for said mechanism, said washing liquid being water with a water soluble liquid additive added; a device for holding a supply of said liquid additive for manually pouring a required quantity thereof into said jar when water is added thereto, said device comprising a container of prismatic shape with a transversely extending portion provided thereon, said container adapted to hold a quantity of said additive, a bracket mounted within said engine compartment and adapted to receive and to hold said container removably, said bracket having provided thereon stop means cooperating with said transversely extending portion on the container, spring means on said bracket adapted to exert force on said container longitudinally thereof to hold the transversely extending portion of the container firmly but resiliently against the stop means on the bracket to restrain the container from longitudinal movements, and spring clip means on said bracket engaging said container and firmly but resiliently restraining the same from transverse movements and thus retaining said container in place under conditions of vehicle operation, said clip means being adapted because of the prismatic form of said container to open and to release said container for removal when manual twisting effort is applied to said container.

2. The construction defined in claim 1, with said clip means and said container having provided thereon, respectively, projections-and-indentation means engageable by insertion of the container into the bracket to enhance the hold of the bracket on the container, and disengageable by applying the manual twisting effort on said prismatic shaped container for removal of the container from the bracket.

3. A device for holding a supply of liquid additive for an automobile windshield washer water container, said device comprising a bottle having a triangular cross section with rounded corners, at least one depression having a rounded cross section and provided at the upper portion of each of its three sides, a bracket made of spring material adapted to be mounted within an engine compartment of an automobile to receive and support said bottle, said bracket including rounded projections entering said depression for retaining the bottle in place, rotating said bottle by hand being effective to cause said bottle to pivot on one of said projections and to free the other projection from the depression at which said other projection engages the bottle, thus freeing said bottle for removal from the bracket.

4. A device for holding a supply of liquid additive for an automobile windshield washer water container, said device comprising a bottle having a triangular cross section with rounded corners, two depressions at the upper portion of each of its three sides at equal distances from the corners of the bottle, a bracket made of spring material and adapted to be mounted within an engine compartment of an automobile to receive and support said bottle, said bracket including a spring strip of material having its lower end bent to support the bottle at the bottom and to exert a resilient upward force on the bottom thereof, and a C-shaped clip secured to the upper end of said strip, the ends of said clip being shaped to enter the near depressions, and stop means on said bottle resisting said resilient upward force, twisting said bottle causing opening of said C-shaped clip and freeing said bottle for removal from the bracket.

5. The device defined in claim 4, said bottle including a shoulder around its upper part, against which shoulder the lower edge of said C-shaped clip rests to resist the resilient upward push exerted on the bottom of the bottle by the bent lower end of the spring strip.

6. A device for holding a supply of liquid additive for an automobile windshield washer liquid container, said device comprising a bottle having a triangular cross section with rounded corners, a bracket made of spring material and adapted to be mounted within an engine compartment of an automobile and to receive and hold said bottle, said bracket including a vertically extending strip having its lower end bent to extend under the bottom of said bottle for supporting the same and exerting upward resilient force thereon, and a C-shaped clip secured to the upper end of said strip to extend in a horizontal plane and to embrace said bottle, each of the ends of said clip having a hole provided therein, and two rounded projections on each side of said bottle, with two of said projections on different sides of the bottle adapted to enter said holes on the clip and to resist the upward resilient force exerted on the bottle by the bent end of said strip, and the two projections on the third side contacting said strip being adapted to clear the same, twisting said bottle causing opening of said C-shaped clip and releasing said bottle for removal from the bracket.

References Cited in the file of this patent

UNITED STATES PATENTS

| D. 4,170 | Rose | June 21, 1870 |
| D. 11,864 | Lahey | July 13, 1880 |
| D. 109,021 | Lloyd | Mar. 29, 1938 |
| 1,442,712 | Doerner | Jan. 16, 1923 |
| 2,234,360 | Whitson | Mar. 11, 1941 |

FOREIGN PATENTS

| 27,509 | Great Britain | Aug. 27, 1914 |
| 276,147 | Great Britain | Aug. 25, 1927 |
| 29,231 | Australia | July 17, 1931 |